United States Patent
Gentry et al.

(10) Patent No.: US 7,353,395 B2
(45) Date of Patent: Apr. 1, 2008

(54) AUTHENTICATED ID-BASED CRYPTOSYSTEM WITH NO KEY ESCROW

(75) Inventors: Craig B. Gentry, Mountain View, CA (US); Alice Silverberg, Columbus, OH (US)

(73) Assignee: NTT DoCoMo Inc., Tokyo (JP)

( * ) Notice: Subject to any disclaimer, the term of this patent is extended or adjusted under 35 U.S.C. 154(b) by 780 days.

(21) Appl. No.: 10/185,889

(22) Filed: Jun. 28, 2002

(65) Prior Publication Data

US 2003/0182554 A1  Sep. 25, 2003

Related U.S. Application Data

(60) Provisional application No. 60/366,292, filed on Mar. 21, 2002, provisional application No. 60/366,196, filed on Mar. 21, 2002.

(51) Int. Cl.
*H04L 9/00* (2006.01)
*H04K 1/00* (2006.01)

(52) U.S. Cl. .................. 713/171; 713/169; 713/170; 380/277; 380/285; 380/45; 380/259; 705/71

(58) Field of Classification Search ........ 713/169–171; 380/277, 285, 45, 259, 260–262; 705/71
See application file for complete search history.

(56) References Cited

U.S. PATENT DOCUMENTS

| | | | |
|---|---|---|---|
| 4,309,569 A | 1/1982 | Merkle | 178/22.08 |
| 5,590,197 A | 12/1996 | Chen et al. | 380/24 |
| 6,336,188 B2 * | 1/2002 | Blake-Wilson et al. | 713/171 |
| 6,792,533 B2 * | 9/2004 | Jablon | 713/171 |
| 7,007,164 B1 * | 2/2006 | Euchner | 713/168 |
| 2002/0154782 A1 | 10/2002 | Chow et al. | 380/278 |

FOREIGN PATENT DOCUMENTS

EP  1 051 036 A2  8/2000

OTHER PUBLICATIONS

Yoon et al., A New Approach to Efficient Verifiable Secret Sharing for Threshold KCDSA Signature, Dec. 9-10, 1999, Information Security and Cryptology—ICISC'99, pp. 208-220.*

(Continued)

*Primary Examiner*—Minh Dieu Nguyen
(74) *Attorney, Agent, or Firm*—Edward C. Kwok; MacPherson Kwok Chen & Heid LLP

(57) ABSTRACT

A method and system are provided for determining a shared secret between two entities in a cryptosystem. A first random secret is selected that is known to the first entity and unknown to the second entity. A first intermediate shared secret component is determined using the first random secret and a system parameter. The first intermediate shared secret component is communicated to the second entity. A second random secret is selected that is known to the second entity, but unknown to the first entity. A second intermediate shared secret component is determined using the second random secret and the system parameter. The second intermediate shared secret component is communicated to the first entity. It is confirmed that both the first entity and the second entity know a non-interactive shared secret. An interactive shared secret is determined using the first random secret, the second random secret, and the system parameter.

8 Claims, 5 Drawing Sheets

OTHER PUBLICATIONS

N. Koblitz, *Elliptic Curve Cryptosystems*, Mathematics of Computation, vol. 48, No. 177, Jan. 1987, pp. 203-209.

Y. Dodis, M. Yung, *Exposure-Resilience for Free: The Hierarchical ID-Based Encryption Case*, 2002.

U. Feige, A. Fiat, A. Shamir, *Zero Knowledge Proofs of Identity*, 1987 ACM O-89791-22-7/87/0006-0210, pp. 210-217.

S.S. Al-Riyami, K.G. Paterson, *Authenticated Three Party Key Agreement Protocols From Pairings*, 2002.

C.G. Günter, A.B. Boveri, *An Identity-Based Key-Exchange Protocol*, pp. 29-37, 1998.

A. Fiat, A. Shamir, *How to Prove Yourself: Practical Solutions to Identification and Signature Problems*, 1998, pp. 186-194.

J.C. Cha and J.H. Cheon, *An Identity-Based Signature from Gap Diffie-Hellman Groups*, Cryptology ePrint archive, Report 2002/018, 2002. http://eprint.iacr.org/.

N.P. Smart, *An Identity-Based Authenticated Key Agreement Protocol Based on the Weil Pairing*, Cryptology ePrint Archive, Report 2001/111, 2001. http://eprint.iacr.org/.

D. Boneh, M. Franklin, *Identity-Based Encryption from the Weil Pairing*, Advances in Cryptology—Crypto2001, Springer LNCS 2139.

C. Cocks, *An Identity Based Encryption Scheme Based On Quadratic Equations*, 2001.

J. Horwitz, B. Lynn, *Toward Hierarchial Indentity-Based Encryption*, 2002.

M. Girault, *Self-Certified Public Keys*, 1998, pp. 490-497.

L.C. Guillou, J. Quisquater, *A Practical Zero-Knowledge Protocol Fitted to Security Microprocessor Minimizing Both Transmission and Memory*, Advances in Cryptology—EuroCrypt'88, Lect. Notes in Computer Science, vol. 330, pp. 123-128, Springer-Verlag (1988).

R. Blom, *An Optimal Class of Symmetric Key Generation Systems*, 1998, pp. 336-338.

C. Blundo, A. De Santis, A. Herzberg, S. Kutten, U. Vaccaro, M. Yung, *Perfectly-Secure Key Distribution for Dynamic Conferences*, 1998, Springer-Verlag, pp. 471-486.

F. Hess, *Exponent Group Signature Schemes and Efficient Identity Based Signature Schemes based on Pairings*, Cryptology ePrint Archive, Report 2002/12, 2002. http://eprint.iacr.org/.

K. Rubin, A. Silverberg, *Supersingular Abelian Varieties in Cryptolog, y* 2002.

W. Diffie, M.E. Hellman, *New Directions in Cryptography*, pp. 29-40. 1976.

A. Menezes, P. van Oorschot, S. Vanstone, *Chapter 12 Key Establishment Protocols*, Handbook of Applied Cryptography, 1997, pp. 489-541.

V.S. Miller, *Use of Elliptic Curves in Cryptography*, 1998, pp. 417-426.

D. Boneh, B. Lynn, H. Shacham, *Short Signatures from the Weil Pairing*, Advances in Cryptology: Asiacrypt 2001 (LNCS 2248), pp. 514-532, 2001.

E. Fujisaki, T. Okamoto, *Secure Integration of Asymmetric and Symmetric Encryption Schemes*, Michael Wiener (Ed.): Crytpto'99, LNCS 1666, pp. 537-554, 1999.

A. Shamir, *Identity-Based Cryptosystems and Signature Schemes*, 1998, Springer-Verlag, pp. 46-53.

U. Maurer, Y. Yacobi, *A Remark on a Non-Interactive Public-Key Distribution System*, 1998.

G. Hanaoka, T. Nishioka, Y. Zheng, H. Imai, *A Hierarchical Non-Interactive Key-Sharing Scheme with Low Memory Size and High Resistance Against Collusion Attacks*, The Computer Journal, vol. 45, No. 3, 2002.

G. Hanaoka, T. Nishioka, Y. Zheng, H. Imai, *An Efficient Hierarchical Identity-Based Key-Sharing Method Resistant Against Collusion-Attacks*, JSPS-REFT 96P00604, pp. 348-362, 2002.

A. Joux, *A One Round Protocol for Tripartite Diffie-Hellman*, W. Bosma (Ed.), ANTS-IV, LNCS 1838, pp. 385-393, 2000.

\* cited by examiner

AUTHENTICATED ID-BASED CRYPTOSYSTEM WITH NO KEY ESCROW

RELATED APPLICATIONS

Applicants hereby claim priority under 35 U.S.C. § 119(e) to provisional U.S. patent applications Ser. No. 60/366,292, filed on Mar. 21, 2002, and Ser. No. 60/366,196, filed on Mar. 21, 2002, both of which are incorporated herein by reference.

BACKGROUND OF THE INVENTION

The present invention relates in general to cryptography and secure communication via computer networks or via other types of systems and devices, and more particularly to the determination and use of a shared secret in an identity-based cryptosystem, for instance, to encode and decode communication between two entities without the disadvantage of key escrow.

Identity-based cryptosystems are public key cryptosystems in which the public key of an entity is derived from its identity (name, address, email address, IP address, etc.). An entity's private key is generated and distributed by a trusted party. The trusted party uses a master secret to generated the private keys.

Protocols exist for two entities to agree upon a shared secret for encryption or authentication of communication between them. In identity-based key agreement protocols, each party typically constructs the shared secret by using its own private key and the other party's public identity. For instance, supersingular elliptic curves and associated pairings have been used to construct relatively secure identity-based signature and key agreement protocols. In addition, more efficient protocols have been developed using supersingular abelian varieties in place of elliptic curves. Because the shared secret is based in part upon the other party's private key, authentication may be provided indirectly by the trusted authority.

Existing identity-based cryptosystems have been limited, however, because they have involved key escrow. The trusted authority knows all secrets in the cryptosystem because it knows the private keys of all parties. As a result, existing identity-based cryptosystems have been vulnerable to passive attacks in which the shared secret used by the two parties can be determined by the trusted authority, or by any other party that discovers the master secret.

Accordingly, there is a need for a secure identity-based key agreement protocol without the disadvantage of key escrow. It therefore is an object of the present invention to provide an secure, authenticated identity-based cryptosystem including key agreement protocols that do not require key escrow. It is a further object of the present invention to provide a key agreement protocol that is secure against a passive attack based on interception of messages between two communicating parties.

BRIEF SUMMARY OF THE PREFERRED EMBODIMENTS

In accordance with the present invention, methods and systems are provided for determining a shared secret between two entities in a cryptosystem. The methods and systems avoid key escrow and are secure against passive attacks based on interception of messages between the two entities.

According to one aspect of the present invention, a method is provided for encoding and decoding a digital message communicated between a first entity and a second entity, both of which know a non-interactive shared secret. A first random secret is selected that is known to the first entity and unknown to the second entity. A first intermediate shared secret component is determined using the first random secret and a system parameter. The first intermediate shared secret component is communicated to the second entity. A second random secret is selected that is known to the second entity, but unknown to the first entity. A second intermediate shared secret component is determined using the second random secret and the system parameter. The second intermediate shared secret component is communicated to the first entity. It is confirmed that both entities know the non-interactive shared secret. An interactive shared secret is determined using the first random secret, the second random secret, and the system parameter. A symmetric key is determined using at least the interactive shared secret. The digital message is then encoded and decoded using the symmetric key.

According to another aspect of the present invention, a method is provided for authenticating a digital message communicated between a first entity and a second entity, both of which know a non-interactive shared secret. A first random secret is selected that is known to the first entity and unknown to the second entity. A first intermediate shared secret component is determined using the first random secret and a system parameter. The first intermediate shared secret component is communicated to the second entity. A second random secret is selected that is known to the second entity, but unknown to the first entity. A second intermediate shared secret component is determined using the second random secret and the system parameter. The second intermediate shared secret component is communicated to the first entity. It is confirmed that both entities know the non-interactive shared secret. An interactive shared secret is determined using the first random secret, the second random secret, and the system parameter. A symmetric key is determined using at least the interactive shared secret. The digital message is then authenticated and confirmed using the symmetric key.

According to another aspect of the present invention, a system is provided for encoding and decoding a digital message communicated between a first entity and a second entity, both of which know a non-interactive shared secret. The system includes a first memory associated with the first entity and operable to store at least a first random secret that is not known to the second entity, a system parameter, a first intermediate shared secret component, a second intermediate shared secret component, an interactive shared secret, and a symmetric key. A second memory associated with the second entity is provided, and is operable to store at least a second random secret that is not known to the first entity, the system parameter, the first intermediate shared secret component, the second intermediate shared secret component, the interactive shared secret, and the symmetric key. The system also includes a first processor associated with the first entity and operable to select the first random secret, to determine the first intermediate shared secret component using the first random secret and the system parameter, to communicate the first intermediate shared secret component to the second entity, to receive the second intermediate shared secret component from the second entity, to determine the interactive shared secret using the first random secret and the second intermediate shared secret component, to confirm that the second entity knows the non-interactive shared secret, to determine the symmetric key using at least the interactive shared secret, to encode the message using the symmetric key, and to communicate the encoded message to the second entity. A second processor associated with the second entity also is provided, and is operable to select the second random secret, to determine the second intermediate shared secret component using the second random secret and the system parameter, to communicate the second intermediate shared secret component to the first entity, to receive the first intermediate shared secret component from the first entity, to determine the interactive shared secret using the second random secret and the first intermediate shared secret component, to confirm that the first entity knows the non-interactive shared secret, to determine the symmetric key using at least the interactive shared secret, to receive the encoded message from the first entity; and to decode the encoded message using the symmetric key.

According to another aspect of the present invention, a system is provided for authenticating a digital message communicated between a first entity and a second entity, both of which know a non-interactive shared secret. The system includes a first memory associated with the first entity and operable to store at least a first random secret that is not known to the second entity, a system parameter, a first intermediate shared secret component, a second intermediate shared secret component, an interactive shared secret, and a symmetric key. A second memory associated with the second entity is provided, and is operable to store at least a second random secret that is not known to the first entity, the system parameter, the first intermediate shared secret component, the second intermediate shared secret component, the interactive shared secret, and the symmetric key. The system also includes a first processor associated with the first entity and operable to select the first random secret, to determine the first intermediate shared secret component using the first random secret and the system parameter, to communicate the first intermediate shared secret component to the second entity, to receive the second intermediate shared secret component from the second entity, to determine the interactive shared secret using the first random secret and the second intermediate shared secret component, to confirm that the second entity knows the non-interactive shared secret, to determine the symmetric key using at least the interactive shared secret, to generate a message authentication code using the symmetric key, and to communicate the message authentication code to the second entity. A second processor associated with the second entity also is provided, and is operable to select the second random secret, to determine the second intermediate shared secret component using the second random secret and the system parameter, to communicate the second intermediate shared secret component to the first entity, to receive the first intermediate shared secret component from the first entity, to determine the interactive shared secret using the second random secret and the first intermediate shared secret component, to confirm that the first entity knows the non-interactive shared secret, to determine the symmetric key using at least the interactive shared secret, to receive the message authentication code from the first entity; and to confirm the message authentication code using the symmetric key.

BRIEF DESCRIPTION OF THE DRAWINGS

The subsequent description of the preferred embodiments of the present invention refers to the attached drawings, wherein.

DETAILED DESCRIPTION OF THE PREFERRED EMBODIMENTS

Figure 1:
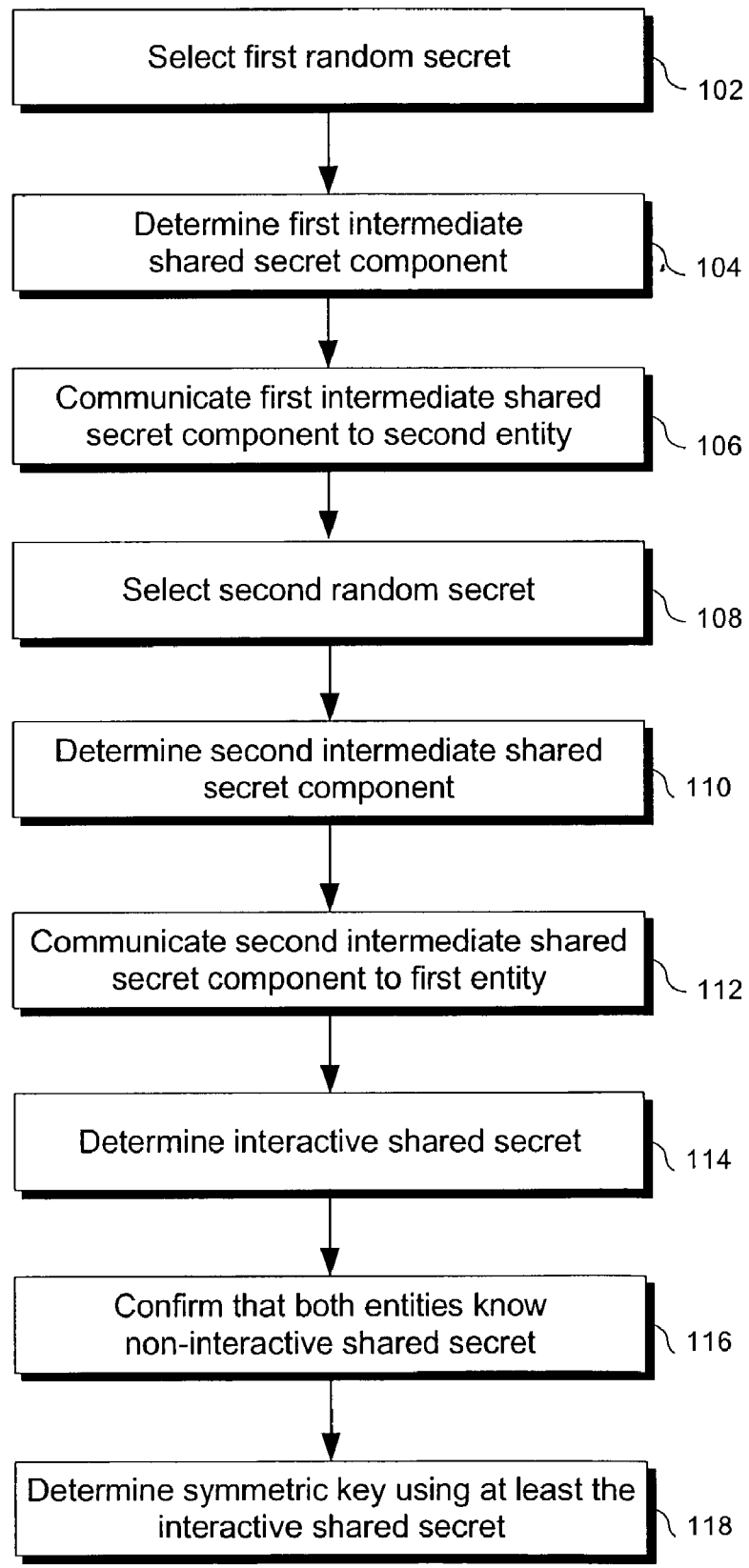
FIG. 1 shows a flow diagram illustrating a method of determining a shared secret between two entities according to one presently preferred embodiment of the invention.

The presently preferred methods of the invention are based on pairings, such as, for instance, the Weil or Tate pairings associated with elliptic curves or abelian varieties. The methods also are based on the Bilinear Diffie-Hellman problem. They use two cyclic groups $\mathbb{G}$ and $\mathbb{H}$ preferably of the same large prime order l. The first group $\mathbb{G}$ preferably is a group of points on an elliptic curve or abelian variety, and the group law on $\mathbb{G}$ preferably is written additively. The second group $\mathbb{H}$ preferably is a multiplicative subgroup of a finite field, and the group law on $\mathbb{H}$ preferably is written multiplicatively. However, other types of groups may be used as $\mathbb{G}$ and $\mathbb{H}$ consistent with the present invention.

The methods also use a generator P of the first group $\mathbb{G}$ In addition, a function $\hat{e}: \mathbb{G} \times \mathbb{G} \rightarrow \mathbb{H}$ is provided for mapping two elements of the first group $\mathbb{G}$ to one element of the second group $\mathbb{H}$. The function $\hat{e}$ preferably satisfies two conditions. First, the function $\hat{e}$ preferably is bilinear, such that if Q and R are in $\mathbb{G}$ and a and b are integers, then $\hat{e}(aQ, bR) = \hat{e}(Q, R)^{ab}$. Accordingly, $\hat{e}(aP, bP) = \hat{e}(P, p)^{ab} = \hat{e}(bP, aP)$. Second, the function $\hat{e}$ also preferably is efficiently computable.

The Bilinear Diffie-Hellman problem is that of finding $\hat{e}(P, p)^{abc}$ if P, aP, bP, and cP are known, but a, b, and c are not known. Solving the Diffie-Hellman problem in $\mathbb{G}$ solves the Bilinear Diffie-Hellman problem because $\hat{e}(P, P)^{abc} = \hat{e}(abP, cP)$. Similarly, solving the Diffie-Hellman problem in $\mathbb{H}$ solves the Bilinear Diffie-Hellman problem because, if $g = \hat{e}(P, P)$, then $g^{abc} = (g^{ab})^c$ where $g^{ab} = \hat{e}(aP, bP)$ and $g^c = \hat{e}(P, cP)$. For instance, suppose E is a supersingular elliptic curve or abelian variety over a finite field F; suppose $P \in E(F)$ is a point of order l (relatively prime to the characteristic of F); and suppose e is the Weil pairing on the l-torsion on E. Let $\mathbb{G}$ be the group generated by P, and let $\mathbb{H}$ be the group of l-th roots of unity in the algebraic closure of F. If f is an automorphism of E such that $f(P) \notin \mathbb{G}$ then defining $\hat{e}: \mathbb{G} \times \mathbb{G} \rightarrow \mathbb{H}$ by $\hat{e}(Q, R) = e(Q, f(R))$ gives a function $\hat{e}$ that satisfies the two conditions set forth above. Further, this ê is non-degenerate. For instance, if ê(aP, bP)=ê(P, cP), then abP=cP.

The presently preferred methods of the invention include a third party private key generator (PKG) that has a master secret $s \in (\mathbb{Z}/\ell\mathbb{Z})^*$. The master secret s preferably is randomly chosen. The public key $P_A$ of a first entity preferably is the result of applying a hash function h:$\{0,1\}^* \to \mathbb{G}$ to the first entity's identity to yield the element $P_A$ of the first group $\mathbb{G}$. The PKG determines the first entity's private key $S_A = sP_A$ and provides the private key to the first entity. Similarly, a second entity's public key $P_B \in \mathbb{G}$ is the image of the second entity's identity under the hash function h, and the PKG provides the second entity with the appropriate private key $S_B = sP_B$. Accordingly, without any interaction, the first and second entities share a non-interactive shared secret $S_{AB} := \hat{e}(P_A, S_B) = \hat{e}(P_A, P_B)^s = \hat{e}(S_A, P_B) = S_{BA}$. This may be referred to as a non-interactive shared secret. The PKG also knows this shared secret component because the PKG knows both s and the entities' private keys $S_A$ and $S_B$.

The non-interactive shared secret $S_{AB}$ is secure if the Bilinear Diffie-Hellman problem is hard. For instance, if $h(ID_A) = P_A = \alpha P$ and $h(ID_B) = P_B = \beta P$ for some random $\alpha, \beta \in (\mathbb{Z}/\ell\mathbb{Z})^*$ it is difficult to determine $S_{AB} = \hat{e}(P, P)^{\alpha\beta s}$ without knowing $\alpha$, $\beta$, or S.

Referring now to the accompanying drawings, FIG. 1 shows a flow diagram illustrating a method of determining a shared secret between two entities according to one presently preferred embodiment of the invention. The first entity selects a first random secret (step 102), and determines a first intermediate shared secret component using the first random secret and a system parameter (step 104). The first random secret may be a random number, a random collection of numbers, or some other random information. The first entity then communicates the first intermediate shared secret component to the second entity (step 106). The second entity selects a second random secret (step 108), and determines a second intermediate shared secret component using the second random secret and the system parameter (step 110). The second random secret may be a random number, a random collection of numbers, or some other random information. The second entity then communicates the second intermediate shared secret component to the first entity (step 112). Both entities then determine an interactive shared secret using the first random secret, the second random secret, and the system parameter (step 114). The first entity determines the interactive shared secret using the first random secret and the second intermediate shared secret component. Similarly, the second entity determines the interactive shared secret using the second random secret and the first intermediate shared secret component. Both entities also confirm the other entity's identity by confirming the other entity's knowledge of a non-interactive shared secret (step 116), such as, for instance, $S_{AB}$. Both entities then determine a symmetric key using at least the interactive shared secret (step 118).

This method avoids key escrow, and is secure against passive interception attacks, because it uses two random secrets, each of which is known to only one of the two communicating entities, and is not known to the PKG. The first random secret is not known to the second entity, and the second random secret is not known to the first entity. Neither random secret is known to the PKG, or to anyone else. Moreover, neither random secret is communicated directly between the parties. Instead, the parties communicate intermediate shared secret components that are based on the random secrets. Because it is difficult to determine the random secrets from the intermediate shared secret components, the random secrets remain secure. Accordingly, this key agreement protocol is secure because, without knowing at least one of the random secrets, it is difficult for an attacker to determine the interactive shared secret or, ultimately, the symmetric key.

The step of confirming the other entity's knowledge of the non-interactive secret (step 116) may be accomplished in a number of ways. For instance, the symmetric key may be determined using both the non-interactive shared secret and the interactive shared secret. Alternatively, the first entity may prove that it knows the non-interactive shared secret by generating a message authentication code ("MAC") for the first intermediate shared secret component using the non-interactive shared secret as the key, and communicating this first MAC to the second entity. The second entity may then confirm that the first entity knows the non-interactive shared secret by confirming the message authentication code using the non-interactive shared secret as the key. Likewise, the second entity may prove that it knows the non-interactive shared secret by generating a MAC for the second intermediate shared secret component in a similar manner, and by communicating the second MAC to the first entity. By confirming the second MAC using the non-interactive shared secret as the key, the first entity confirms that the second entity knows the non-interactive shared secret.

Figure 2:
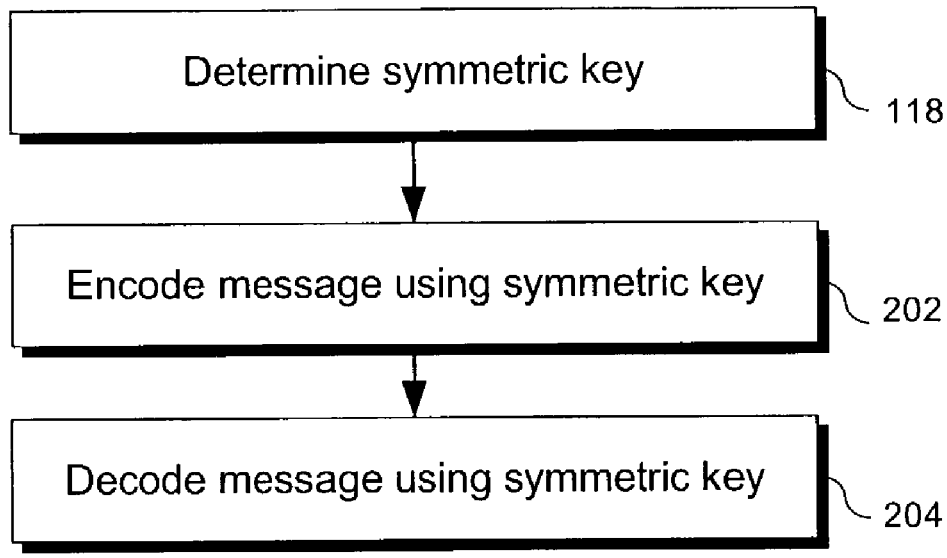
FIG. 2 shows a flow diagram illustrating a method of encoding and decoding a message between two entities according to another presently preferred embodiment of the invention.

The symmetric key derived according to the method of FIG. 1 may be useful in many applications. For instance, FIG. 2 shows a flow diagram illustrating a method of encoding an decoding a message between two entities using the symmetric key. First, the entities determine a symmetric key (step 118) according to the method of FIG. 1. The first entity then encodes the message using the symmetric key (step 202). The first entity may use any known symmetric encryption scheme, such as the Advanced Encryption Standard ("AES") to encode the message. The first entity then communicates the encoded message to the second entity, and the second entity decodes the encoded message (step 204) using the same symmetric key and encryption scheme that the first entity used to encode the message.

Figure 3:
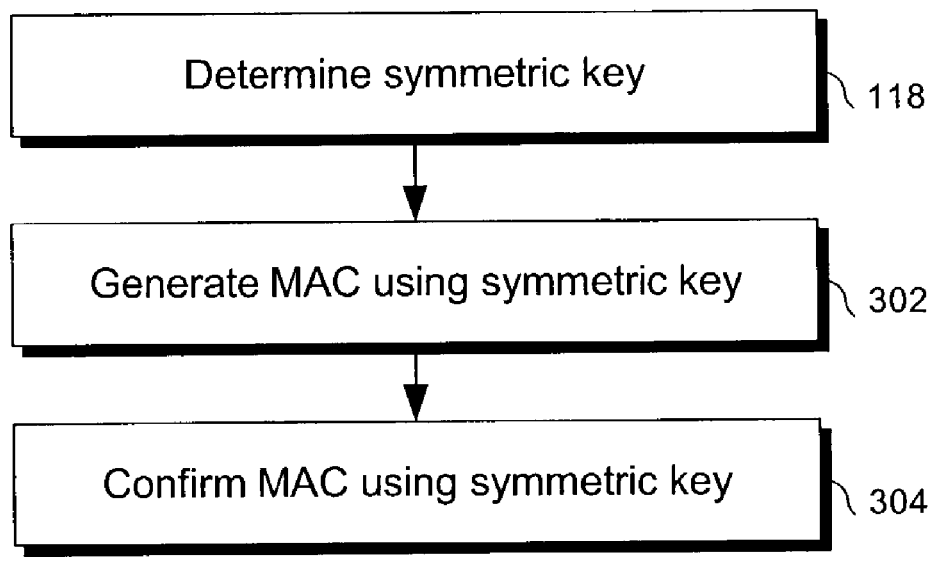
FIG. 3 shows a flow diagram illustrating a method of authenticating a message between two entities according to another presently preferred embodiment of the invention.

Another useful application of the symmetric key derived according to the method of FIG. 1 is authentication of the content of a message. For instance, FIG. 3 shows a flow diagram illustrating a method of authenticating a message using the symmetric key. Again, the entities first determine the symmetric key (step 118) according to the method of FIG. 1. The first entity generates a MAC of the message using the symmetric key (step 302). The first entity may generate the MAC using any known authentication scheme, such as a hash function based on the content of the message. The first entity then communicates the encoded message and the MAC to the second entity, and the second entity confirms the MAC (step 304) using the same symmetric key and authentication scheme that the first entity used to generate the MAC.

Figure 4:
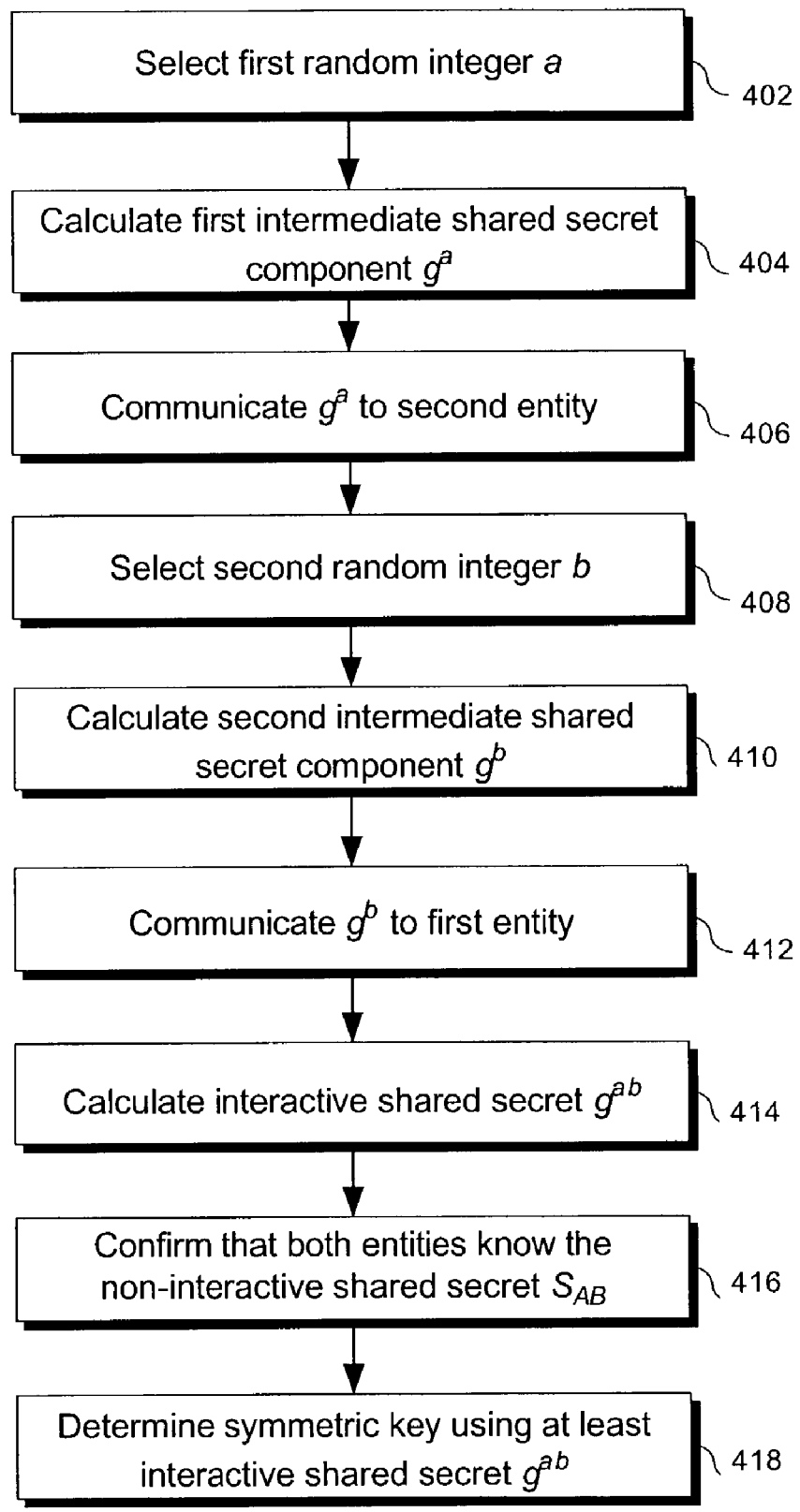
FIG. 4 shows a flow diagram illustrating a method of determining a shared secret between two entities according to another presently preferred embodiment of the invention.

FIG. 4 shows a flow diagram illustrating a method of determining a shared secret between two entities according to another presently preferred embodiment of the invention. The first entity selects a first random integer $\alpha$ (step 402), and calculates a first intermediate shared secret component $g^\alpha$ (step 404), where g is a generator of the second cyclic group $\mathbb{H}$. The generator g preferably is either $\hat{e}(P_A, P_B)$ or $\hat{e}(P, P)$, where P is given as a public system parameter. The first entity then communicates the first intermediate shared secret component $g^a$ to the second entity (step 406). The second entity selects a second random integer b (step 408), and calculates a second intermediate shared secret component $g^b$ (step 410). The second entity then communicates the second intermediate shared secret component $g^b$ to the first entity (step 412). Both entities then calculate an interactive shared secret $g^{ab}$ (step 414). Because neither entity knows the other entity's chosen random integer, the first entity calculates $g^{ab}=(g^a)^b$, and the second entity calculates $g^{ab}=(g^b)^a$. Both entities also confirm that the other entity knows a non-interactive shared secret (step 416), such as, for instance, $S_{AB}$. Both entities then may determine a symmetric key using at least the interactive shared secret $g^{ab}$ (step 118).

The step of confirming the other entity's knowledge of the non-interactive secret (step 416) may be accomplished in a number of ways. For instance, the symmetric key may be determined (step 418) using both the non-interactive shared secret and the interactive shared secret $g^{ab}$. For instance, this may be accomplished through a standard algebraic operation such as multiplication of $S_{AB}$ and $g^{ab}$, or by applying a hash function to both $S_{AB}$ and $g^{ab}$, or by some other means of combination. Alternatively, the first entity may prove that it knows the non-interactive shared secret by generating a MAC for the first intermediate shared secret component $g^a$ using the non-interactive shared $S_{AB}$ secret as the key, and communicating this first MAC to the second entity. The second entity may then confirm that the first entity knows the non-interactive shared secret $S_{AB}$ by confirming the message authentication code using the non-interactive shared secret $S_{AB}$ as the key. Likewise, the second entity may prove that it knows the non-interactive shared secret $S_{AB}$ by generating a MAC for the second intermediate shared secret component $g^b$ in a similar manner, and by communicating the second MAC to the first entity. By confirming the second MAC using the non-interactive shared secret $S_{AB}$ as the key, the first entity confirms that the second entity knows the non-interactive shared secret $S_{AB}$.

Like the symmetric key derived according to FIG. 1, the symmetric key derived according to this embodiment of the invention is useful for many applications. For instance, it may be used in the encryption scheme described with reference to FIG. 2 and the message authentication scheme described with reference to FIG. 3.

Figure 5:
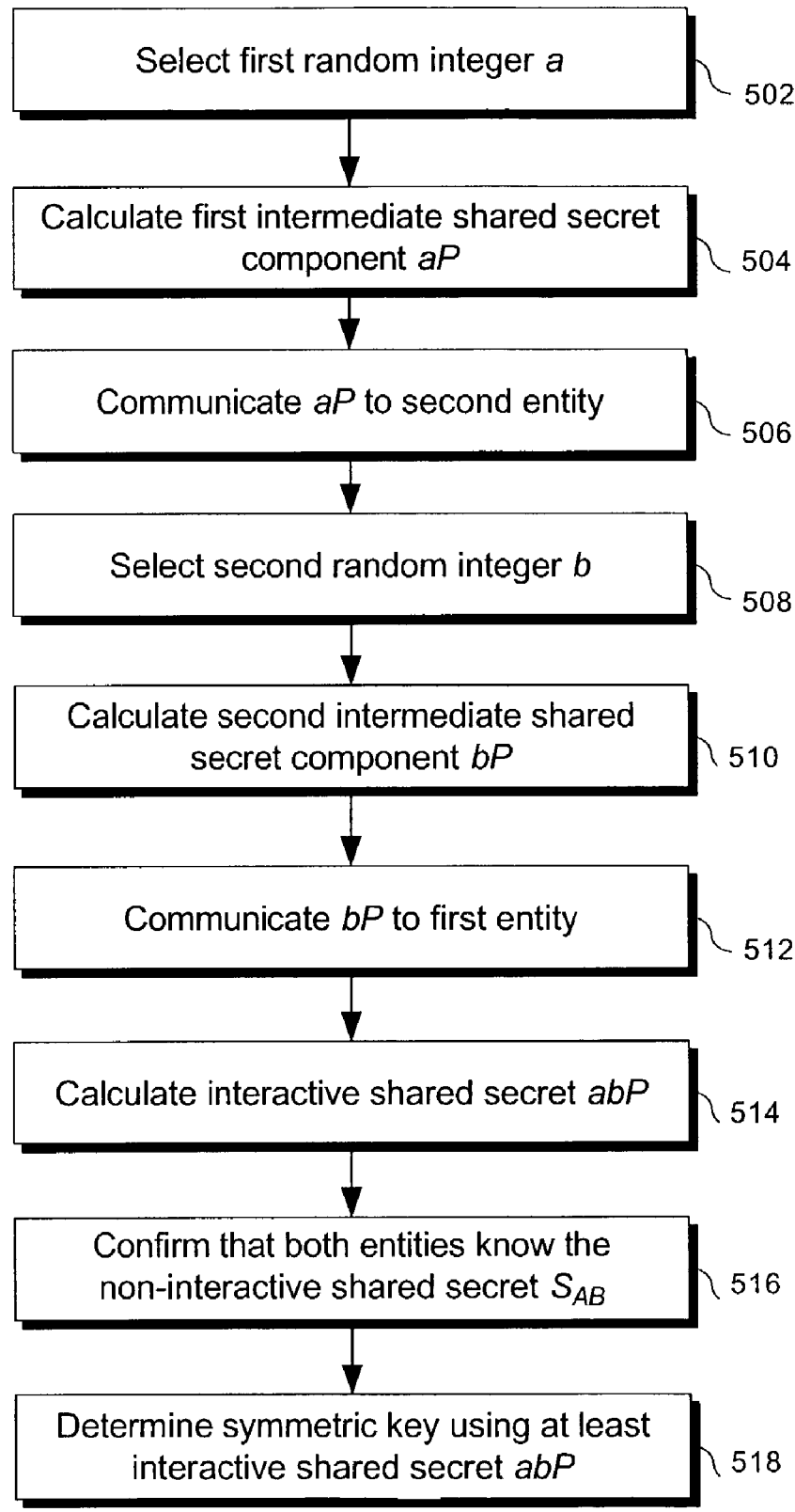
FIG. 5 shows a flow diagram illustrating a method of determining a shared secret between two entities according to another presently preferred embodiment of the invention.

FIG. 5 shows a flow diagram illustrating another method of determining a shared secret between two entities according to another presently preferred embodiment of the invention. The intermediate shared secret components in this method are elements of the first cyclic group $\mathbb{G}$ unlike those of the previous embodiment, which were elements of the second cyclic group $\mathbb{H}$. If the two groups are chosen such that $\mathbb{G}$ is a group of points on an elliptic curve or abelian variety and $\mathbb{G}$ is a subgroup of a finite field, then this embodiment reduces the required bandwidth because representation of an element in $\mathbb{G}$ requires less bits than that of an element in $\mathbb{H}$.

According to this embodiment, the first entity selects a first random integer a (step 502), and calculates a first intermediate shared secret component aP (step 504), where P is a public parameter from the first cyclic group $\mathbb{G}$. The first entity then communicates the first intermediate shared secret component aP to the second entity (step 506). The second entity selects a second random integer b (step 508), and calculates a second intermediate shared secret component bP (step 510). The second entity then communicates the second intermediate shared secret component bP to the first entity (step 512). Both entities then calculate an interactive shared secret abP (step 514). Because neither entity knows the other entity's chosen random integer, the first entity calculates abP=a(bP), and the second entity calculates abP=b(aP). Both entities also confirm that the other entity knows a non-interactive shared secret (step 416) such as, for instance, $S_{AB}$. Both entities then may determine a symmetric key using at least the interactive shared secret abP.

The step of confirming the other entity's knowledge of the non-interactive secret (step 516) may be accomplished in a number of ways. For instance, the symmetric key may be determined (step 518) using both the non-interactive shared secret and the interactive shared secret abP. For instance, this may be accomplished through a standard algebraic operation such as multiplication of $S_{AB}$ and ê(abP, abP), or by applying a hash function to both $S_{AB}$ and abP, or by some other means of combination. Alternatively, the first entity may prove that it knows the non-interactive shared secret by generating a MAC for the first intermediate shared secret component aP using the non-interactive shared $S_{AB}$ secret as the key, and communicating this first MAC to the second entity. The second entity may then confirm that the first entity knows the non-interactive shared secret $S_{AB}$ by confirming the message authentication code using the non-interactive shared secret $S_{AB}$ as the key. Likewise, the second entity may prove that it knows the non-interactive shared secret $S_{AB}$ by generating a MAC for the second intermediate shared secret component aP in a similar manner, and by communicating the second MAC to the first entity. By confirming the second MAC using the non-interactive shared secret $S_{AB}$ as the key, the first entity confirms that the second entity knows the non-interactive shared secret $S_{AB}$.

Optionally, one of the entities' public keys $P_A$ or $P_B$ may be used as an alternative to the use of P in this embodiment of the invention. If a public key is used in place of P, some ordering should be established to determine which public key will be used, for example, based on the bit representations of $P_A$ and $P_B$.

Like the symmetric keys derived according to FIGS. 1 and 4, the symmetric key derived according to this embodiment of the invention is useful for many applications. For instance, it may be used in the encryption scheme described with reference to FIG. 2 and the message authentication scheme described with reference to FIG. 3.

Additional security may be added to the method of FIG. 5 by adding hash functions to thwart various possible attacks. For instance, the non-interactive shared secret $S_{AB}$ may be replaced with $$S_{AB}^{h(aP,bP)},$$

wherein h: $\mathbb{G} \to (\mathbb{Z}/\ell\mathbb{Z})^*$ is a cryptographic hash function. Similarly, $S_{AB}$ may be replaced by $$S_{AB}^{h_1(abP)}$$

and/or ê(abP, abP) may be replaced by ê(abP, $h_2$(abP)), wherein $h_1$: $\mathbb{G} \to (\mathbb{Z}/\ell\mathbb{Z})^*$ and $h_2$: $\mathbb{G} \to \mathbb{G}$ are cryptographic hash functions. Using these additional hash functions, it is clear that even a potential attacker that knows the master secret s also must solve the Diffie-Hellman problem in the group $\mathbb{G}$ to determine the interactive shared secret.

Figure 6:
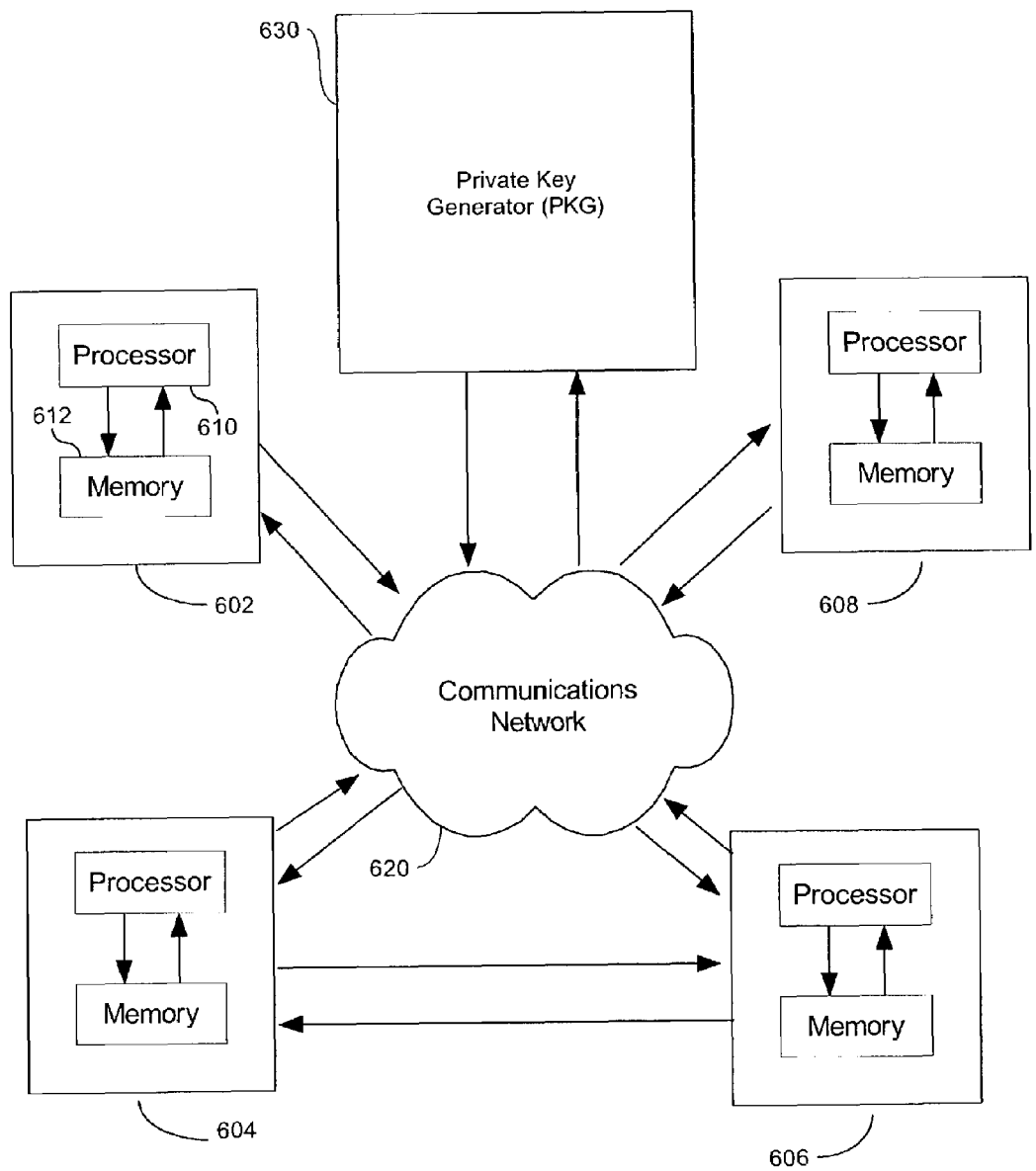
FIG. 6 shows a block diagram depicting a cryptosystem including key agreement protocols with no key escrow according to another presently preferred embodiment of the invention.

Various methods of determining shared secrets and using the shared secrets in encryption and authentication schemes according to the present invention have been described. A system for implementing these methods according to another embodiment of the present invention will now be described with reference to FIG. 6. The system includes a number of entities 602, 604, 606, 608, each of which may determine a shared secret with respect to any other entity. The system also includes a private key generator (PKG) 630 that generates and distributes private keys to the various entities 602, 604, 606, and 608.

Each entity includes a processor 610 in bidirectional communication with a memory 612. The processor 610 executes suitable program code for carrying out the procedures described above, and for generating information to be transmitted to another entity. Suitable program code may be created according to methods known in the art. The memory 612 stores the program code, as well as intermediate results and other information used during execution of the digital signature generation and verification procedures.

A communications network 620 is provided over which the entities 602, 604, 606, and 608 and the PKG 630 may communicate. The communications network 620 may be of various common forms, including, for instance, a LAN computer network, a WAN computer network, and/or a mobile telephone network provide suitable communication networks.

The invention has been described in detail with particular reference to preferred embodiments thereof and illustrative examples, but it will be understood that variations and modifications can be effected within the spirit and scope of the invention.

The invention claimed is:

1. A method of encoding a digital message communicated between a first entity and a second entity, wherein the first entity and the second entity both know a non-interactive shared secret, comprising, at the first entity:
    selecting a first random secret that is independent of the non-interactive shared secret, known to the first entity and unknown to the second entity;
    determining a first intermediate shared secret component using the first random secret and a system parameter that is independent of the non-interactive shared secret, such that the first intermediate shared secret component is independent of the non-interactive shared secret;
    communicating the first intermediate shared secret component to the second entity;
    receiving from the second entity a second intermediate shared secret component provided by:
        selecting a second random secret that is independent of the non-interactive shared secret, known to the second entity and unknown to the first entity; and
        determining the second intermediate shared secret component using the second random secret and the system parameter, such that the second intermediate shared secret component is independent of the non-interactive shared secret;
    determining an interactive shared secret using the first random secret and the second intermediate shared secret component;
    determining a symmetric key using the interactive shared secret and the non-interactive shared secret; and
    encoding the digital message using the symmetric key.

2. A method as in claim 1, further comprising authenticating the second entity at the first entity using the non-interactive shared secret.

3. A method as in claim 2, wherein the first entity authenticates the second entity by a message authentication code that is generated and communicated to the first entity by the second entity.

4. A method as in claim 1, wherein the first and second intermediate shared secrets are each a member of a group of points on an elliptical curve.

5. A method as in claim 1, wherein the non-interactive shared secret comprises a cryptographic hash function.

6. A method as in claim 1, wherein the first and second intermediate shared secret components are based on Weil or Tate pairings.

7. A method as in claim 1, wherein the first and second intermediate shared secret components are based on the Bilinear Diffie-Hellman problem.

8. A system for encoding and decoding a digital message communicated between a first entity and a second entity, wherein the first entity and the second entity both know a non-interactive shared secret, comprising:
    a first memory associated with the first entity, the first memory operable to store at least a first random secret that independent of the non-interactive shared secret and is not known to the second entity, a system parameter that is independent of the non-interactive shared secret, a first intermediate shared secret component, a second intermediate shared secret component, an interactive shared secret, and a symmetric key;
    a second memory associated with the second entity, the second memory operable to store at least a second random secret that is independent of the non-interactive shared secret and not known to the first entity, the system parameter, the first intermediate shared secret component, the second intermediate shared secret component, the interactive shared secret, and the symmetric key;
    a first processor associated with the first entity, the first processor operable to select the first random secret, to determine the first intermediate shared secret component using the first random secret and the system parameter, such that the first intermediate shared secret component is independent of the non-interactive shared secret to communicate the first intermediate shared secret component to the second entity, to receive the second intermediate shared secret component from the second entity, to determine the interactive shared secret using the first random secret and the second intermediate shared secret component, to determine the symmetric key using the interactive shared secret and the non-interactive shared secret, to encode the message using the symmetric key, and to communicate the encoded message to the second entity; and
    a second processor associated with the second entity, the second processor operable to select the second random secret, to determine the second intermediate shared secret component using the second random secret and the system parameter, to communicate the second intermediate shared secret component to the first entity, to receive the first intermediate shared secret component from the first entity, to determine the interactive shared secret using the second random secret and the first intermediate shared secret component, such that the first intermediate shared secret component is independent of the non-interactive shared secret to determine the symmetric key using the interactive shared secret and the non-interactive shared secret, to receive the encoded message from the first entity; and to decode the encoded message using the symmetric key.

* * * * *